US012651854B2

(12) United States Patent
Herdling et al.

(10) Patent No.: US 12,651,854 B2
(45) Date of Patent: Jun. 9, 2026

(54) TERMINAL BLOCK ASSEMBLY, SUBSTRATE AND METHOD OF MANUFACTURE THEREOF

(71) Applicant: BLACK & DECKER INC., New Britain, CT (US)

(72) Inventors: Andre Herdling, Lohrheim (DE); Petr Dusik, Idstein (DE)

(73) Assignee: BLACK & DECKER INC., New Britain, CT (US)

( * ) Notice: Subject to any disclaimer, the term of this patent is extended or adjusted under 35 U.S.C. 154(b) by 495 days.

(21) Appl. No.: 18/245,179

(22) PCT Filed: Sep. 10, 2021

(86) PCT No.: PCT/EP2021/074989
§ 371 (c)(1),
(2) Date: Mar. 14, 2023

(87) PCT Pub. No.: WO2022/053643
PCT Pub. Date: Mar. 17, 2022

(65) Prior Publication Data
US 2023/0361494 A1 Nov. 9, 2023

(30) Foreign Application Priority Data
Sep. 14, 2020 (GB) ........................................ 201440

(51) Int. Cl.
*H01R 9/24* (2006.01)
*H01M 50/543* (2021.01)
(Continued)

(52) U.S. Cl.
CPC ........ *H01R 9/2458* (2013.01); *H01M 50/543* (2021.01); *H01R 12/515* (2013.01);
(Continued)

(58) Field of Classification Search
CPC .... H01R 9/2458; H01R 12/58; H01R 12/515; H01R 13/504; H01R 2201/00; H01M 50/543
See application file for complete search history.

(56) References Cited

U.S. PATENT DOCUMENTS

| 6,315,584 B1 * | 11/2001 | Greenside | .......... H01R 13/6485 |
| | | | 439/135 |
| 6,350,149 B1 * | 2/2002 | Nakane | ................ H01R 13/113 |
| | | | 439/500 |

(Continued)

FOREIGN PATENT DOCUMENTS

DE 2618539 A1 11/1977

OTHER PUBLICATIONS

Combined Search and Examination Report, GB Application No. 2014406.9 Mar. 16, 2021, 7 pages, IPO.
(Continued)

*Primary Examiner* — Harshad C Patel
(74) *Attorney, Agent, or Firm* — Michael Aronoff

(57) ABSTRACT

A terminal block assembly for a power tool comprises a terminal block having at least one primary terminal configured for electrical connection with a battery and at least one secondary terminal in electrical connection with the at least one primary terminal. A substrate is mountable on the terminal block. The substrate has at least one first electrical connector electrically connectable with the at least one secondary terminal and at least one second electrical connector in electrical connection with the at least one first electrical connector. At least one wire is electrically connected to the at least one second electrical connector. An overmold is configured to cover the at least one second electrical connector and at least a portion of the at least one wire.

18 Claims, 9 Drawing Sheets

(51) Int. Cl.

| | |
|---|---|
| *H01R 12/51* | (2011.01) |
| *H01R 12/58* | (2011.01) |
| *H01R 13/504* | (2006.01) |

(52) U.S. Cl.
CPC ........... *H01R 12/58* (2013.01); *H01R 13/504* (2013.01); *H01R 2201/00* (2013.01)

(56) References Cited

U.S. PATENT DOCUMENTS

| | | | |
|---|---|---|---|
| 8,555,493 | B2 | 10/2013 | Xu et al. |
| 9,426,883 | B2 * | 8/2016 | McPherson ......... H01L 23/3675 |
| 9,601,729 | B2 * | 3/2017 | Naito .................. H01M 50/296 |
| 10,840,772 | B2 * | 11/2020 | Duernegger .......... B24B 23/028 |
| 11,518,019 | B2 * | 12/2022 | Wolperding .............. B25F 5/02 |
| 11,695,182 | B2 * | 7/2023 | Naito .................. H01M 50/394 |
| | | | 429/82 |
| 11,772,245 | B2 * | 10/2023 | Fischer ................. B25B 21/023 |
| | | | 173/117 |
| 12,076,846 | B2 * | 9/2024 | Fahrner ................... B25F 5/006 |
| 2012/0309235 | A1 | 12/2012 | Yuan |
| 2014/0008093 | A1 * | 1/2014 | Patel ......................... H02J 7/00 |
| | | | 173/217 |
| 2015/0249237 | A1 * | 9/2015 | Naito ..................... H01R 12/58 |
| | | | 429/7 |
| 2018/0337575 | A1 * | 11/2018 | Sengiku ............... H01R 13/516 |
| 2019/0259984 | A1 * | 8/2019 | Nishikawa .......... H01M 10/425 |
| 2020/0262368 | A1 * | 8/2020 | Lunde .................... H01R 12/53 |
| 2020/0303986 | A1 * | 9/2020 | Stubner .................. H02K 29/08 |
| 2022/0169172 | A1 * | 6/2022 | Yang ..................... B60Q 1/525 |

OTHER PUBLICATIONS

International Search Report and Written Opinion, PCT Application No. PCT/EP2021/074989, Jan. 12, 2022, 11 pages, EPO.

International Preliminary Report on Patentability, PCT Application No. PCT/EP2021/074989, Mar. 7, 2023, 8 pages, WIPO.

* cited by examiner

TERMINAL BLOCK ASSEMBLY, SUBSTRATE AND METHOD OF MANUFACTURE THEREOF

The present disclosure relates to a terminal block assembly. In particular, the present disclosure relates to terminal block assembly, substrate and method of manufacture thereof for a power tool.

Known power tools have an electric motor for causing a tool to reciprocate or rotate. For example a power tool such as a hammer drill can have a hammer assembly that reciprocates and impacts on the output shaft. This means that the power tool can experience vibration due to the action of the motor and the hammer assembly.

A problem with the power tool vibrating means that the soldered electrical connections can become disconnected over time due to the poor quality of soldering during manufacture. The quality of a soldered connection in the power tool can vary depending on the skill of worker on the assembly line. This means some power tools will require repair and maintenance due to faults in the soldered connections.

Examples of the present disclosure aim to address the aforementioned problems.

According to an aspect of the disclosure there is a terminal block assembly for a power tool comprising: a terminal block having at least one primary terminal configured for electrical connection with a battery and at least one secondary terminal in electrical connection with the at least one primary terminal; a substrate mountable on the terminal block, the substrate having at least one first electrical connector electrically connectable with the at least one secondary terminal and at least one second electrical connector in electrical connection with the at least one first electrical connector; at least one wire electrically connected to the at least one second electrical connector; and an overmold configured to cover the at least one second electrical connector and at least a portion of the at least one wire.

Optionally, the overmold mechanically secures the portion of the at least one wire to the substrate.

Optionally, the substrate is mechanically and electrically connectable to the at least one secondary terminal.

Optionally, the at least one secondary terminal projects through a reciprocal hole in the substrate.

Optionally, the overmold is more flexible than the substrate.

Optionally, the overmold comprises one or more ribs or cut-aways arranged to permit relative movement of at least another portion of the wire with respect to the substrate.

Optionally, the terminal block is mounted to a housing of the power tool and the terminal block and/or the substrate are configured to move relative to the housing.

Optionally, the at least one wire comprises at least a first wire mounted to the substrate at a first position on the substrate and at least a second wire mounted to the substrate at a second position and the overmold covers both at least a portion of the at least one first wire and at least a portion of the at least one second wire.

Optionally, the portion of the at least one wire is soldered to the at least one second electrical connector.

Optionally, the overmold is formed from a rubber material, a thermoplastic elastomer, and/or a plastic material.

Optionally, the at least one secondary terminal is soldered to the at least one first electrical connector.

Optionally, the overmold covers the at least one secondary terminal and the at least one first electrical connector.

Optionally, the substrate is a printed circuit board.

Optionally, the overmold completely surrounds at least a portion of the substrate.

Optionally, the portion of the at least one wire is mounted to the substrate at a first position on the substrate and the at least one secondary terminal is mechanically and electrically connected to the substrate at a second position which is different to the first position.

In a second aspect of the disclosure there is provided a power tool comprising a terminal block assembly according the first aspect.

Optionally, the battery is removably mountable to the power tool and, when the battery is mounted to the power tool, the battery is electrically connected to the at least one primary terminal.

In a third aspect of the disclosure there is provided a substrate mountable on a terminal block for a power tool, the terminal block having at least one primary terminal configured for electrical connection with a battery and at least one secondary terminal in electrical connection with the at least one primary terminal, wherein the substrate comprises: at least one first electrical connector electrically connectable with the at least one secondary terminal; at least one second electrical connector in electrical connection with the at least one first electrical connector; at least one wire electrically connected to the at least one second electrical connector; and an overmold configured to cover the at least one second electrical connector and at least a portion of the at least one wire.

In a fourth aspect of the disclosure there is a method of manufacture of a power tool comprising: connecting at least one wire to at least one second electrical connector on a substrate; covering the at least one second electrical connector and at least a portion of the at least one wire with an overmold; mounting the substrate on at least one terminal of a terminal block, the substrate having at least one first electrical connector in electrical connection with the at least one second electrical connector; connecting the at least one terminal to the at least one first electrical connector; and mounting the terminal block and substrate on a housing of the power tool.

In a fifth aspect of the disclosure there is a printed circuit board for a power tool terminal block comprising; at least one wire electrically connected to the printed circuit board; an overmold covering the at least one wire mechanically securing at least a portion of the at least one wire; and a connector arranged to electrically and mechanically couple the printed circuit board directly to at least one terminal of the terminal block such that the at least one wire is electrically connected to the at least one terminal.

In a sixth aspect of the disclosure there is provided a terminal block assembly for a power tool comprising: a terminal block having at least one primary terminal configured for electrical connection with a battery and at least one secondary terminal in electrical connection with the at least one primary terminal; a substrate mountable on the terminal block, the substrate having at least one first electrical connector electrically connectable with the at least one secondary terminal and at least one second electrical connector in electrical connection with the at least one first electrical connector; at least one wire electrically connected to the at least one second electrical connector; and a curable material configured to cover the at least one second electrical connector and at least a portion of the at least one wire.

Optionally, the curable material is an overmold or an overglue.

Various other aspects and further examples are also described in the following detailed description and in the attached claims with reference to the accompanying drawings, in which:

Figure 8:
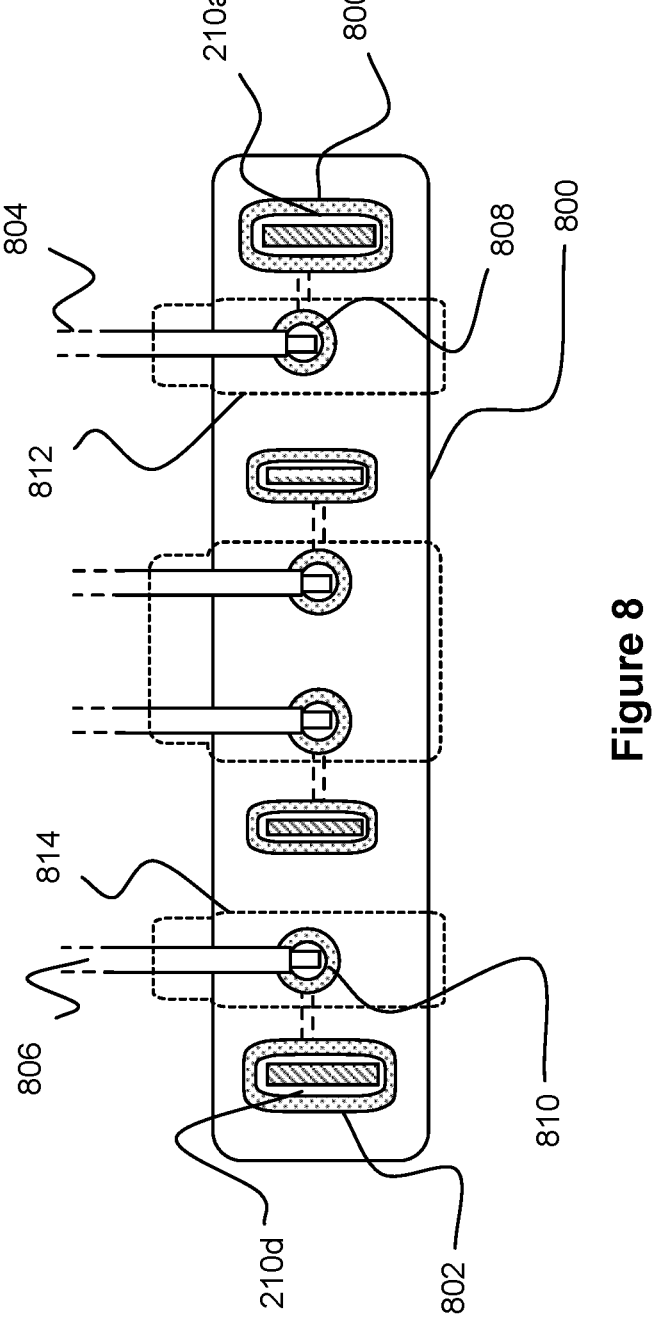
Figure 9:
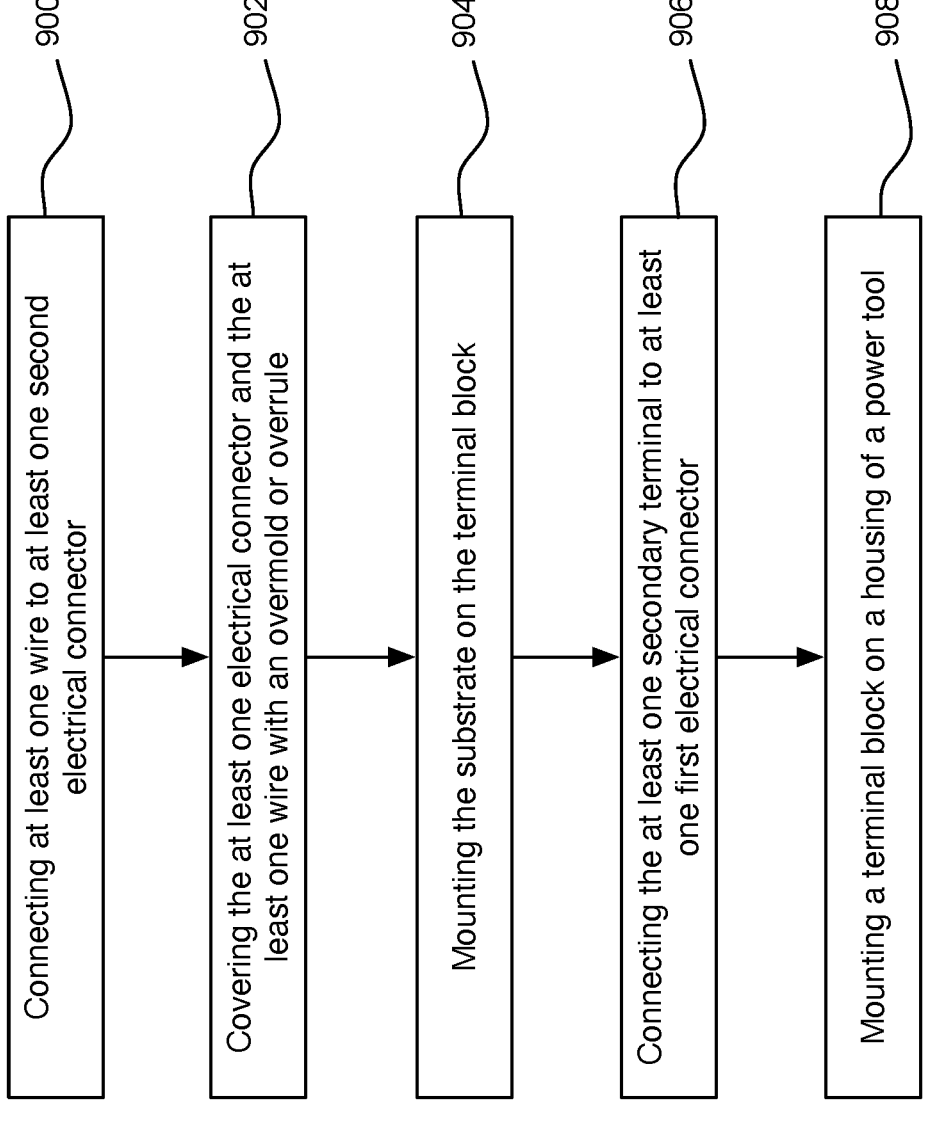

FIGS. 7a, 7b, 7c, and 7d show plan views of a substrate mountable on a terminal block according to different examples;

FIG. 8 shows a plan view of a substrate mountable on a terminal block according to another example; and FIG. 9 shows a flow diagram of a method of manufacture of the substrate, terminal block assembly and power tool according to an example.

Figure 1:
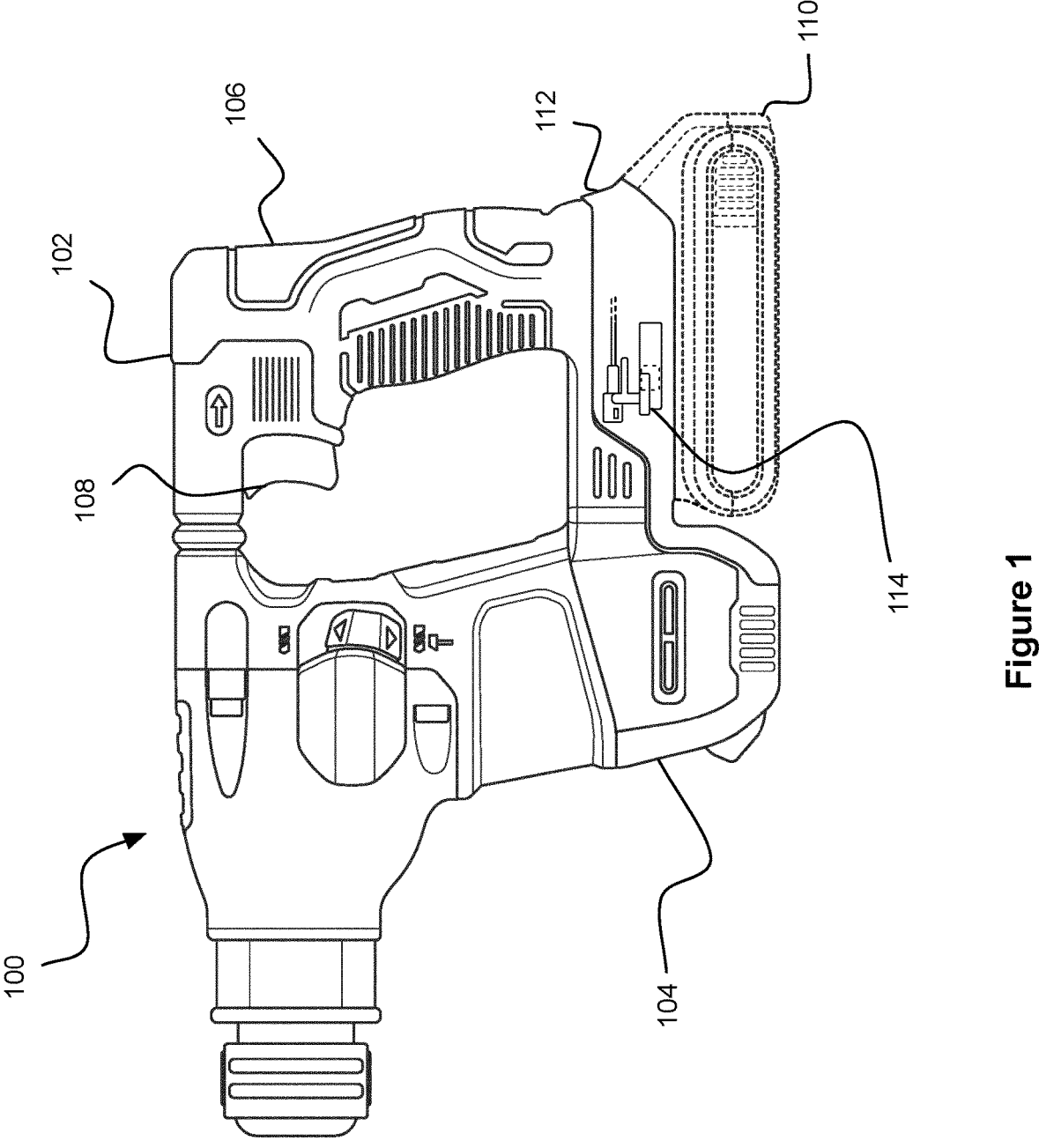
FIG. 1 shows a side view of a power tool according to an example.

FIG. 1 shows a side view of a power tool 100. The power tool 100 as shown in FIG. 1 is a hammer drill. Whilst FIG. 1 shows a hammer drill, in other examples any other type of power tool 100 can be used. For example, the power tool 100 can be a plunge saw, a reciprocating saw, a circular saw, an impact driver, a drill, a multitool, an oscillating tool, a rammer, a plate compactor or any other power tool which comprises electrical connections which experience vibration during operation of the power tool 100.

The power tool 100 comprises a housing 102. The housing 102 comprises a clam shell type construction having two halves which are fastened together. The halves of the housing 102 are fastened together with screws but in alternative examples any suitable means for fastening the housing 102 together may be used such as glue, clips, bolts and so on. For the purposes of clarity, the fastenings in the housing 102 are not shown in FIG. 1.

An electric motor (not shown) is mounted in a motor housing portion 104 of the housing 102. The motor housing portion 104 is integral with the housing 102.

As shown in FIG. 1, the housing 102 comprises a handle 106 for the user to grip during use. A trigger button 108 is mounted on the handle 106 which is used by the user to activate the electric motor. The electric motor is electrically connected to a battery pack 110.

The battery pack 110 (represented with dotted lines in FIG. 1) is removably mountable to the housing 102 at the base of the handle 106 in a battery terminal housing portion 112. In some examples, the battery pack 110 is integral to the housing 102 and not removeable. Alternatively in other examples the power tool 100 is powered additionally or alternatively with mains power (not shown).

Figure 3:
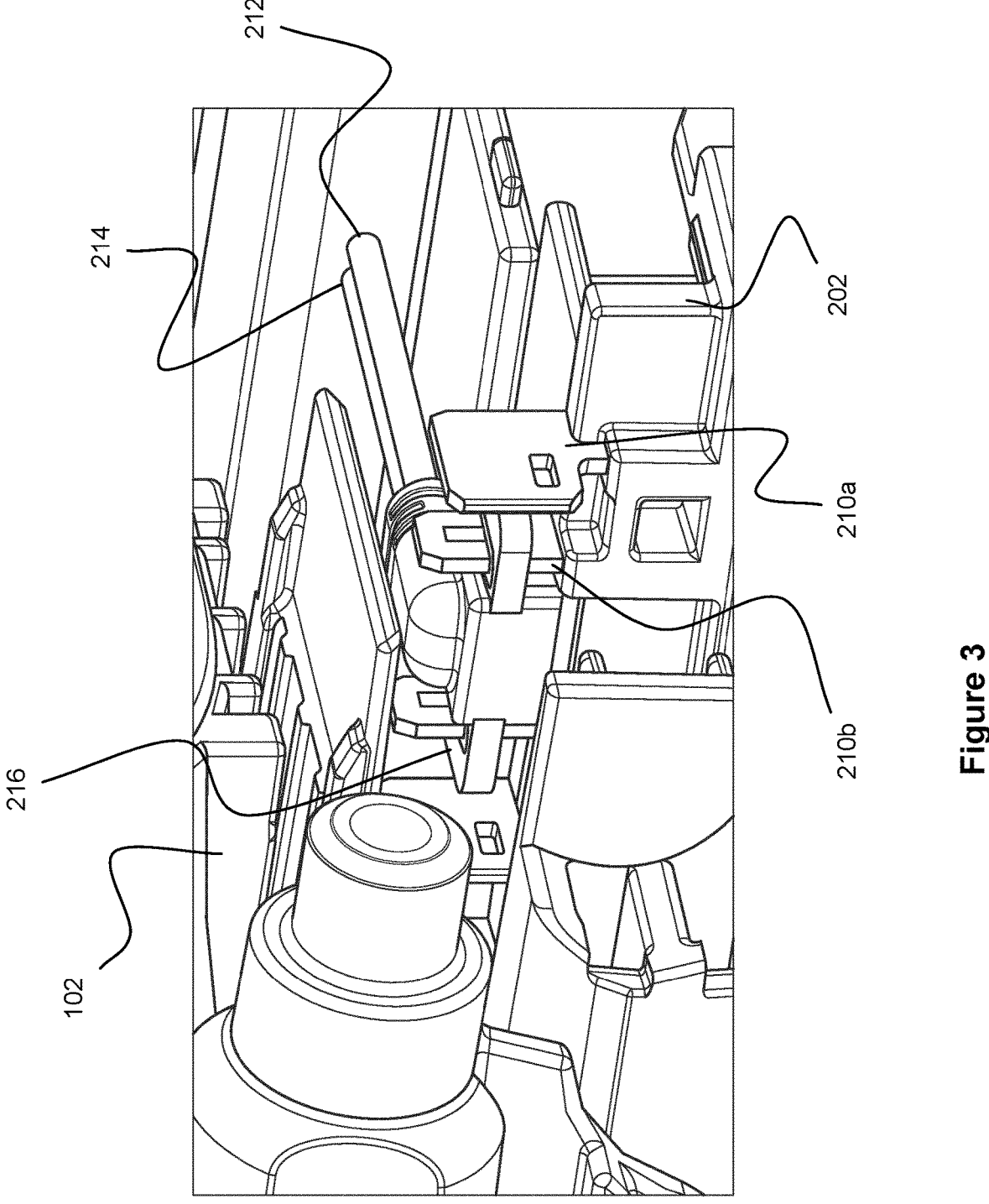
FIG. 3 shows a partial cut away perspective view of a power tool according to an example.

The battery pack 110 comprises a plurality of battery connectors (not shown) configured to electrically and mechanically engage with a plurality of reciprocal primary terminals 200a, 200b, 200c, 200d in a terminal block assembly 114. The terminal block assembly 114 is mounted to the housing 102 as shown in FIG. 3. FIG. 3 shows a partial cut away perspective view of the power tool 100 according to an example.

In some examples, the terminal block assembly 114 is moveable relative to the housing 102 when mounted to the housing 102. This means that the primary terminals 200a, 200b, 200c, 200d can maintain electrical contact with the battery connectors on the battery pack 110 when the power tool 100 vibrates during operation. In some other examples, the terminal block assembly 114 is rigidly fixed to the housing 102.

Figure 2:
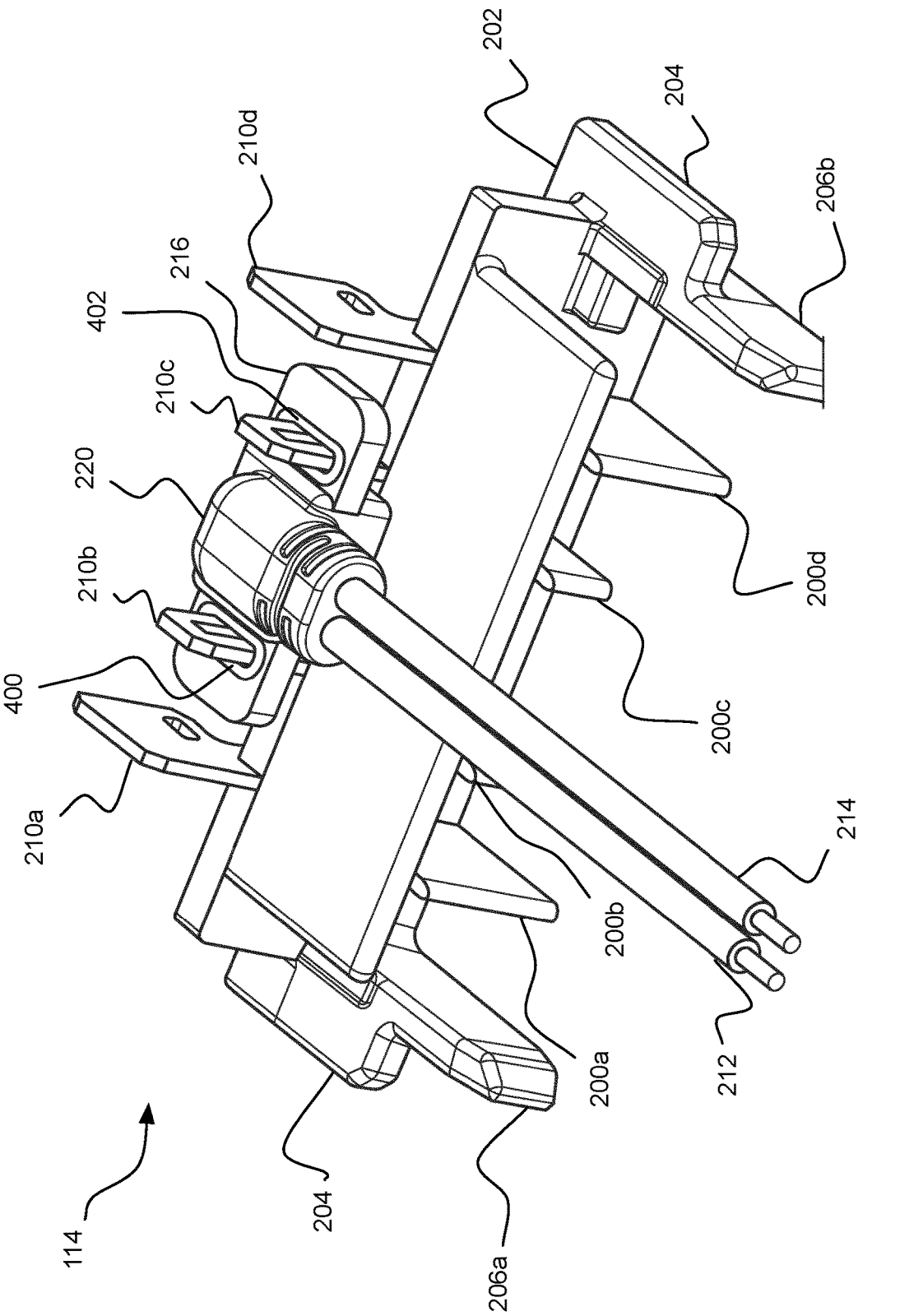
FIG. 2 shows a perspective view of a terminal block assembly according to an example.

The terminal block assembly 114 will now be discussed in reference to FIG. 2. FIG. 2 shows a perspective view of the terminal block assembly 114 according to an example.

The terminal block assembly 114 comprises a terminal block 202 and a substrate 216 mounted on the terminal block 202. The substrate 216 is in electrical and mechanical engagement with the terminal block 202. The substrate 216 will be discussed in more detail below.

The terminal block 202 is arranged to fix the primary terminals 200a, 200b, 200c, 200d in position with respect to each other. This means that the primary terminals 200a, 200b, 200c, 200d are in the correct position for the plurality of battery connectors on the battery pack 110.

The terminal block 202 comprises a frame like structure for mounting to the housing 102 and mounting a plurality of components thereto. The terminal block 202 comprises one or more ribs 204 for engaging in reciprocal slots (not shown) within the housing 102. In some examples, the ribs 204 are arranged to loosely engage the reciprocal slots and thereby permit some relative movement of the terminal block 202 with respect to the housing 102.

The terminal block 202 also optionally comprises a pair of engagement arms 206a, 206b, for engaging an upper surface (not shown) of the battery pack 110. The engagement arms 206a, 206b, help align the plurality of battery connectors of the battery pack 110 with a plurality of reciprocal primary terminals 200a, 200b, 200c, 200d when mounting the battery pack 110 to the power tool 100.

The terminal block 202 comprises an upwardly projecting fin 208 arranged to mount a plurality of secondary terminals 210a, 210b, 210c, and 210d. The secondary terminals 210a, 210b, 210c, and 210d are each respectively electrically connected to the primary terminals 200a, 200b, 200c, 200d. In some examples, the secondary terminals 210a, 210b, 210c, and 210d respectively form unitary elements with the primary terminals 200a, 200b, 200c, 200d. However, in some other examples the secondary terminals 210a, 210b, 210c, and 210d are connected to the primary terminals 200a, 200b, 200c, 200d via wires or electrically conductive tracks. The secondary terminals 210 will be collectively referred to as 210 hereinafter.

The secondary terminals 210 are mounted within the housing 102 of the power tool 100 so that wires 212, 214 can be connected to the electrical circuit (not shown) of the power tool 100. The wires 212, 214 are partially represented in FIG. 2 (and the other Figures) for the purposes of clarity. The wires 212, 214 are routed within the housing 102 to one or more electrical components (not shown) of the electrical circuit (not shown) within the housing 102. In FIG. 2 no wires are shown connected to the outer secondary terminals 210a, 210d for the purposes of clarity. In some examples, wires can be connected to the outer secondary terminals 210a, 210d. Alternatively, the outer secondary terminals 210a, 210d can be connected to a substrate 800 e.g. a printed circuit board 800 as discussed with respect to an alternative example in reference to FIG. 8.

In some examples, the outer primary terminals 200a, 200d mounted in the terminal block 202 are power terminals for providing electrical power to the power tool 100. In some examples, the inner primary terminals 200b, 200c are data communication terminals for connecting a battery controller (not shown) with a power tool controller (not shown). The inner primary terminals 200b, 200c e.g. data communication terminals 200b, 200c can be used for providing status information of the battery pack 110 to the power tool controller. In other examples, each of the primary terminals 200a, 200b, 200c, 200d can be used for both providing power and data communication. In other examples, there may be only two or three primary terminals. In other examples, there may be more than four primary terminals e.g. five or there can be any number of primary terminals. The primary terminals 200a, 200b, 200c, 200d will be collectively referred to as 200 hereinafter.

The wires 212, 214 as shown in FIG. 2 are electrically connected to the substrate 216. In some examples the wires 212, 214 are electrically connected to the substrate 216 via soldering or welding.

Figure 4:
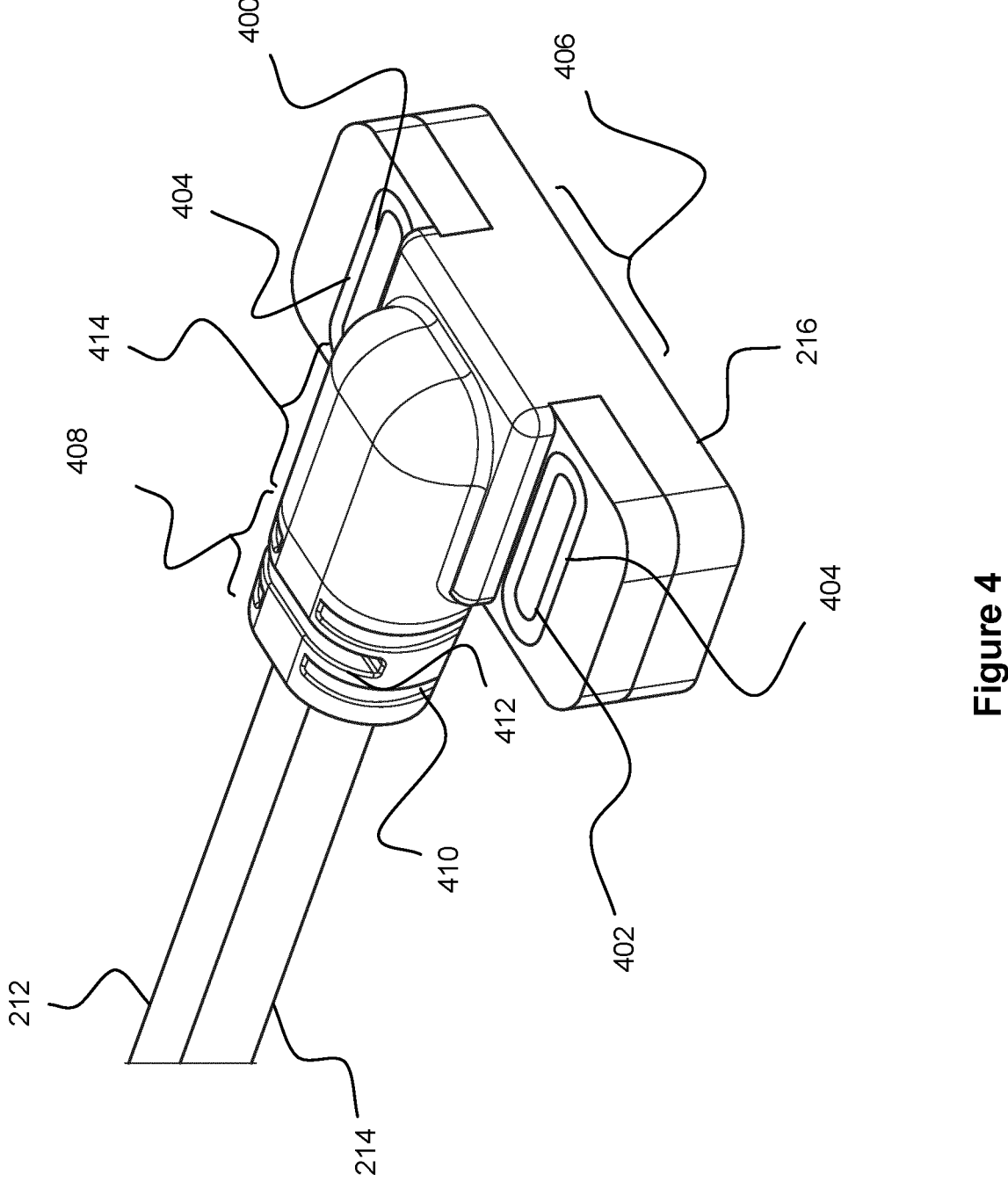
FIG. 4 shows a perspective view of a substrate mountable on a terminal block according to an example.

Turning to FIG. 4, the substrate 216 will be discussed in further detail. FIG. 4 shows a perspective view of the substrate 216 mountable on the terminal block 202 according to an example.

As mentioned previously, the substrate 216 is mounted on the terminal block 202. In some examples, the substrate 216 is a printed circuit board. However, in other examples, the substrate 216 is not a printed circuit board, but a rigid substrate 216 mechanically coupled to the terminal block 202.

In some examples, the substrate 216 has at least one first electrical connector 400, 402 electrically connectable with the at least one second terminal 210. As shown in FIG. 4, the at least one first electrical connector 400, 402 is two terminal through-holes 400, 402. The terminal through-holes 400, 402 are respectively arranged to receive the inner secondary terminals 210b, 210c projecting therethrough. The terminal through-holes 400, 402 in some examples are copper plated. FIG. 4 shows a portion 404 of the copper plated track for receiving solder. In this way, the terminal through-holes 400, 402 can be soldered to the inner secondary terminals 210b, 210c and the terminal through-holes 400, 402 are electrically connected to the inner secondary terminals 210b, 210c. In some other examples, the at least one first electrical connector 400, 402 can be any suitable connector for providing an electrical connection between the inner secondary terminals 210b, 210c and the substrate 216. For example, the at least one first electrical connector 400, 402 can be a screw clamp, a clip, or any other suitable device for making an electrical connection with the inner secondary terminals 210b, 210c. In this way, the at least one first electrical connector 400, 402 in some examples does not require solder for making the electrical connection.

In some examples, the substrate 216 further comprises at least one second electrical connector 700, 702 (best seen in FIG. 7a) in electrical connection with the at least one first electrical connector 400, 402.

Figures 7A, 7B, 7C, 7D:
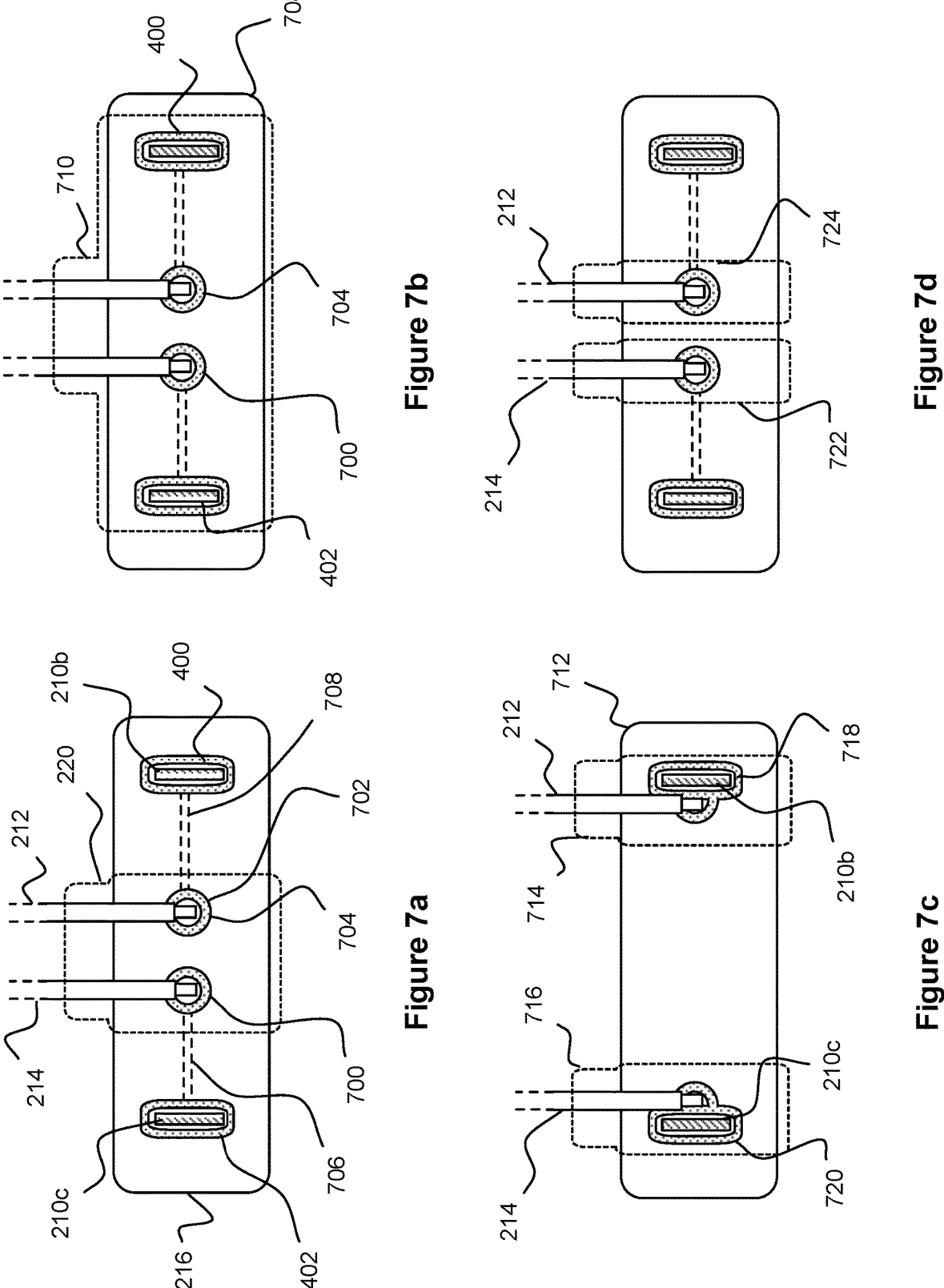

In some examples, the at least one second electrical connector 700, 702 is two wire through-holes 700, 702. The wire through-holes 700, 702 are respectively arranged to receive the wires 212, 214 projecting therethrough. The wire through-holes 700, 702 in some examples are copper plated. FIG. 7a shows a portion 704 of the copper plated track for receiving solder. In this way, the wire through-holes 700, 702 can be soldered to the wires 212, 214 and the wire through-holes 700, 702 are electrically connected to the wires 212, 214. In some other examples, the at least one second electrical connector 700, 702 can be any suitable connector for providing an electrical connection between the wires 212, 214 and the substrate 216. For example, the at least one second electrical connector 700, 702 can be a screw clamp, a clip, or any other suitable device for making an electrical connection with the wires 212, 214. In this way, the at least one second electrical connector 700, 702 in some examples does not require solder for making the electrical connection.

In some examples, the substrate 216 comprises a first conductive track 706 and a second conductive track 708 electrically connecting the wire through-holes 700, 702 with the terminal through-holes 400, 402. As shown in FIG. 7a, the first and second conductive tracks 706, 708 are internal to the substrate 216. However, the first and second conductive tracks 706, 708 can be printed on the surface of the substrate 216. In this way, the inner secondary terminals 210b, 210c are in electrical connection with the wires 212, 214 when soldered to the substrate 216.

In some alternative examples, the substrate 216 does not comprise the first and second conductive tracks 706, 708. Instead the wire through-holes 700, 702 are connected to the terminal through-holes 400, 402 with separate wires (not shown).

Turning back to FIGS. 2 and 4, the substrate 216 will be discussed in further detail. As mentioned above, the wires 212, 214 are electrically connected to the substrate 216. The substrate 216 comprises an overmold 220 which covers the at least one second electrical connector 700, 702 and the at least one wire 212, 214. In this way, the overmold 220 covers the wires 212, 214 once they have been soldered to the wire through-holes 700, 702. This means that the overmold may mechanically secure the wires 212, 214 to the substrate 216. The overmold 220 reduces the mechanical stress on the wires 212, 214 significantly when compared to wires that are only mechanically connected via soldering. This means that the wires 212, 214 move less and the soldered joint is less likely to suffer fatigue and failure. This means that there are no or very few broken wires 212, 214 around the terminal block 202.

In some examples, after the wires 212, 214 have been connected to the substrate 216, the substrate 216 and wires 212, 214 are placed in a mold and an overmold material is molded on the substrate 216. The overmold 220 then cures on the substrate 216 and the wires 212, 214 are protected by the overmold 220.

Once the wires 212, 214 have been covered by the overmold 220, the substrate 216 is directional since the wires 212, 214 project from one side of the substrate 216. This means that correct assembly of the substrate 216 to the terminal block 202 is easier for a worker on the assembly line.

Advantageously, providing a substrate 216, e.g. a printed circuit board 216 as a subassembly which is mounted on the terminal block 202 means that the assembling process is much easier. This is because the soldering process does not depend on the abilities of the workers on the assembly line. The substrate 216 is compact and this means that very little assembly space is required. The substrate 216 also means that the direction of the wires 212, 214 can be predefined and reduces errors in attaching the wrong wires to the terminal block 202. For example, previously a worker could accidently solder the incorrect wire to a secondary terminal 210 in the terminal block 202.

In some examples, the overmold 220 is more flexible than the substrate 216. This means that that material of the overmold 220 will flex when the wires 212, 214 move. Accordingly, the soldered joints (not shown) at the wire through-holes 700, 702 are less likely to move reducing their wear.

Figures 6A, 6B, 6C:
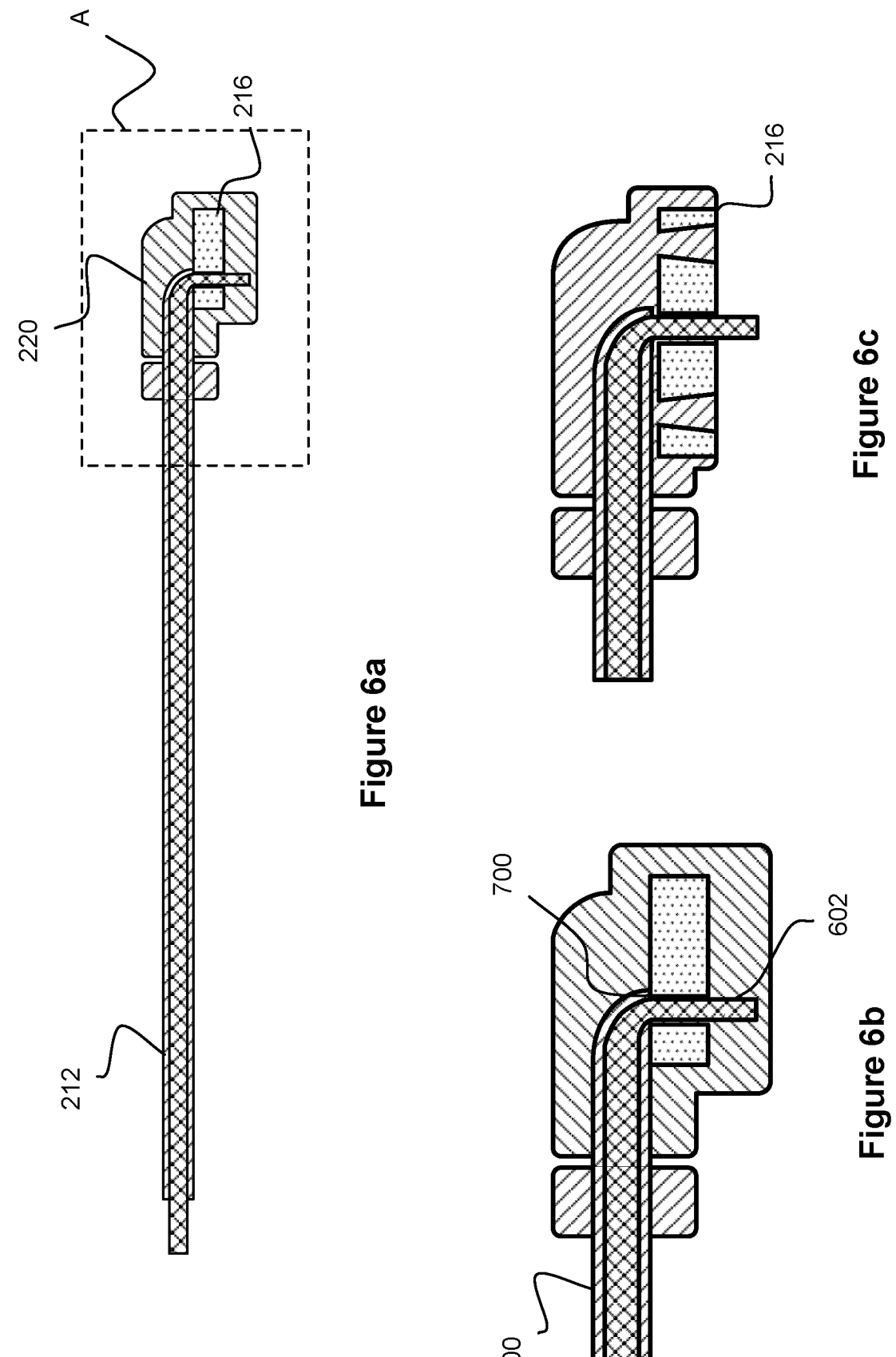
FIGS. 6a, 6b and 6c show cross-sectional views of a substrate mountable on a terminal block according to different examples.

In some examples, the overmold 220 is formed from a rubber material, a thermoplastic elastomer, and/or a plastic material. Turning to FIGS. 6a, 6b, and 6c, the overmold 220 will be discussed in more detail. FIGS. 6a, 6b and 6c show cross-sectional views of the substrate 216 mountable on the terminal block 202 according to different examples. FIG. 6b is a close up of FIG. 6a as represented by the dotted box labelled A.

As shown in FIG. 6b, the overmold 220 completely surrounds at least a portion of the substrate 216. In some examples, the overmold 220 can completely cover the entire surface area of the substrate 216. However, this is less preferred because the terminal block assembly 114 must be covered with the overmold 220 after the substrate 216 is mounted on the terminal block 202. In some preferred examples, the overmold 220 covers a middle portion 406 (best seen from FIG. 4) of the substrate 216 between the terminal through-holes 400, 402.

Since the overmold 220 completely surrounds the middle portion 406 of the substrate 216, the overmold 220 will not peel off from the substrate 216. The wire 212 comprises a sheath 600 and a portion of the sheath 600 is removed to leave an exposed end 602 to project through the wire through-holes 700 and provide a good electrical connection when soldered.

An alternative example of the overmold 220 is shown in FIG. 6c. Instead of completely surrounding the substrate 216, the overmold 220 covers the top and sides of the substrate 216. This may be preferable in order to reduce the profile of the substrate 216 after the overmold 220 has been applied. Additionally less material is required for the overmold 220 when covering only the top and the sides of the substrate 216. FIG. 6c shows that the overmold 220 is molded into fastening holes 604, 606 within the substrate 216. The fastening holes 604, 606 comprise a conical or dovetail shape and lock the overmold 220 to the substrate 216 once the overmold 220 has cured.

Whilst FIGS. 6a, 6b, 6c show the exposed end 602 to projecting through the wire through-holes 700 in other examples, the exposed end 602 does not project through the wire through-holes 700. Instead, the exposed end 602 is positioned on an electrically conductive pad on the substrate 216 and tangentially soldered thereto.

As shown in FIG. 4, the overmold 220 comprises a flexible tail portion 408. The flexible tail portion 408 projects out from the substrate 216 and is arranged to flex more than a body portion 414 of overmold 220 directly covering the substrate 216. The flexible tail portion 408 comprises one or more cut-away portions 410 and ribs 412 so that the flexible tail portion 408 can compress when the wires 212, 214 move with respect to the substrate 216.

Figure 5:
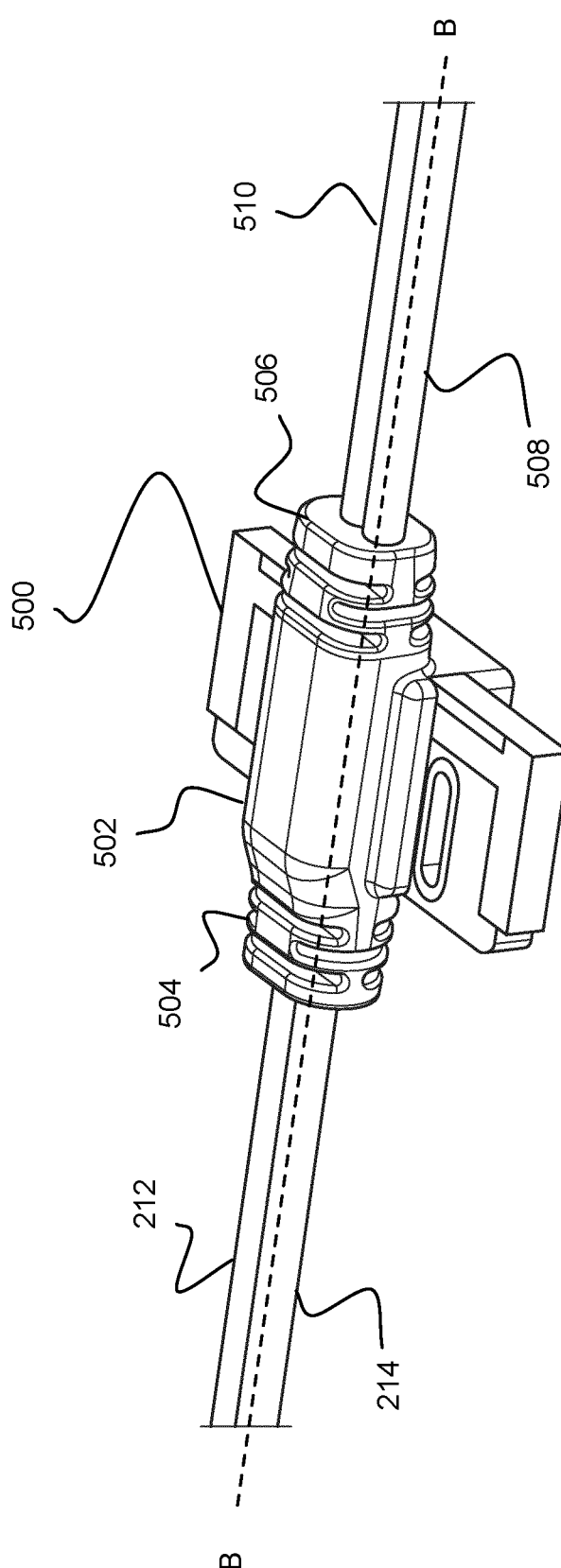
FIG. 5 shows a perspective view of a substrate mountable on a terminal block according to another example.

Another example will now be discussed in reference to FIG. 5. FIG. 5 shows a perspective view of a substrate 500 mountable on the terminal block 202 according to another example.

The substrate 500 as shown in FIG. 5 is the same as the substrate 216 described in reference to FIGS. 2 to 4 except that there are more wires which are electrically connected to the substrate 500. In particular, at least a first wire 212, 214 is mounted to the substrate 500 at a first position on the substrate 500 and at least a second wire 508, 510 is mounted to the substrate 500 at a second position. FIG. 5 shows a first pair of wires 212, 214 similar to the previously described examples. In other examples, there can be any number of wires connected to the substrate 500 at the first and second positions.

As shown in FIG. 5, the first pair of wires 212, 214 extend in one direction and a second pair of wires 508, 510 extend in another direction. The first pair of wires 212, 214 and the second pair of wires 508, 510 extend in opposite directions along a longitudinal axis B-B. In some other examples, the first pair of wires 212, 214 and the second pair of wires 508, 510 can extend in any direction as required.

The overmold 502 covers both the first pair of wires 212, 214 and the second pair of wires 508, 510. The overmold 502 is similar to the previously discussed examples in reference to FIGS. 2 to 4. However, one difference is that the overmold 502 comprises a first flexible tail portion 504 for the accommodating movement of the first pair of wires 212, 214 and a second flexible tail portion 506 for accommodating movement of the second pair of wires 508, 510.

Although not visible in FIG. 5, the wires 212, 214, 508, 510 are electrically connected to the substrate 500 at separate wire through-holes (not shown). In some alternative examples one or more wires from each pair of wires can be electrically connected at the same separate wire through-hole. For example wires 212, 510 can be electrically connected at the same wire through-hole. Similar to the previously discussed examples, the overmold 502 covers the wire through-holes as well as the wires 212, 214, 508, 510.

Turning to FIGS. 7a, 7b, 7c, 7d and 8, further examples will now be discussed. FIGS. 7a, 7b, 7c, and 7d show plan views of the substrate 216 mountable on the terminal block 202 according to different examples. FIG. 8 shows a plan view of a substrate mountable 800 on the terminal block 202 according to another example.

FIG. 7a is a plan view of the substrate 216 previously discussed in reference to FIGS. 2, 3 and 4.

FIG. 7b shows another example of a substrate 708. FIG. 7b is the same as FIG. 7a except that an overmold 710 covers the wire through-holes 700, 702 and the terminal through-holes 400, 402.

FIG. 7c is shows another example of a substrate 712. FIG. 7c is the same as FIG. 7a except that there is a first overmold 714 and a second overmold 716. The substrate 712 as shown in FIG. 7c does not have separate wire through-holes and terminal through-holes. Instead, there are connection through-holes 718, 720 respectively connecting the wires 212, 214 and the inner secondary terminals 210b, 210c. This means that the wires 212, 214 and the inner secondary terminals 210b, 210c can be respectively soldered together at the same electrical connection and optionally at the same time during the same soldering operation.

FIG. 7d is the same as FIG. 7a except that a first overmold 722 covers the first wire 212 and a second overmold 724 covers the second wire 214.

Turning to FIG. 8, another example will now be discussed. FIG. 8 is the same as FIG. 7a except that the substrate 800 is larger and is also mounted to the outer secondary terminals 210a, 210d (as well as the inner secondary terminals 210b, 210c). The outer secondary terminals 210a, 210d also project through the substrate 800 via auxiliary terminal through-holes 802, 804. This is similar to the inner secondary terminals 210b, 210c previously discussed with respect to the examples in FIGS. 2 to 7.

Likewise a third wire 804 and fourth wire 806 are soldered to auxiliary wire through-holes 808, 810 and are respectively covered by a second overmold 812 and a third overmold 814. This means that the substrate 800 can be preassembled and no wires need to be soldered to the terminal block 202 during assembly.

A method of manufacture of a power tool 100 will now be described in reference to FIG. 9. FIG. 9 shows a flow diagram of the manufacture of the substrate 216, the terminal block assembly 114 and the power tool 100.

At least one wire 212, 214 is connected to the at least one second electrical connector 700, 702 on the substrate 216 as shown in step 900 of FIG. 9. As mentioned above, in some examples the wires 212, 214 are soldered to a pad, track or other connection point on the substrate 216.

Then the at least one second electrical connector 700, 702 and the at least one wire 212, 214 are covered with an overmold 220 as shown in step 902 of FIG. 9. In some alternative examples, the overmold can be an overglue or any other suitable material which can adhere and cure over the at least one second electrical connector 700, 702 and at least a portion of the at least one wire 212, 214 instead.

Once the overmold 220 has cured following the molding step 902, the substrate 216 is mounted on the at least one secondary terminal 210b, 210c of the terminal block 202 as shown in step 904 of FIG. 9.

The at least one secondary terminal 210b, 210c is then connected to the at least one first electrical connector 400, 402 as shown in step 906 of FIG. 9.

The terminal block 202 and the substrate 216 are then mounted on the housing 102 of the power tool 100 as shown in step 908 of FIG. 9. In other examples, one or more of the steps as shown in FIG. 9 can be carried out in a different order. For example, the substrate 216 can be mounted on the terminal block 202 before connecting the wires 212, 214 and overmolding. Alternatively the steps of connecting 900, 906 can be carried out in a different order or at the same time.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A terminal block assembly for a power tool comprising:
a terminal block having at least one primary terminal configured for electrical connection with a battery and at least one secondary terminal in electrical connection with the at least one primary terminal;
a substrate mounted on the terminal block, the substrate having at least one first electrical connector electrically connectable with the at least one secondary terminal and at least one second electrical connector in electrical connection with the at least one first electrical connector;
at least one wire electrically connected to the at least one second electrical connector; and
an overmold configured to cover the at least one second electrical connector and at least a portion of the at least one wire.

2. The terminal block assembly according to claim 1 wherein the overmold mechanically secures the portion of the at least one wire to the substrate.

3. The terminal block assembly according to claim 1 wherein the substrate is mechanically and electrically connectable to the at least one secondary terminal.

4. The terminal block assembly according to claim 1 wherein the at least one secondary terminal projects through a reciprocal hole in the substrate.

5. The terminal block assembly according to claim 1 wherein the overmold is more flexible than the substrate.

6. The terminal block assembly according to claim 1 wherein the overmold comprises one or more ribs or cut-aways arranged to permit relative movement of at least another portion of the wire with respect to the substrate.

7. The terminal block assembly according to claim 1 wherein the terminal block is mounted to a housing of the power tool and the terminal block and/or the substrate are configured to move relative to the housing.

8. The terminal block assembly according to claim 1 wherein the at least one wire comprises at least a first wire mounted to the substrate at a first position on the substrate and at least a second wire mounted to the substrate at a second position and the overmold covers both at least a portion of the at least one first wire and at least a portion of the at least one second wire.

9. The terminal block assembly according to claim 8 wherein the portion of the at least one wire is soldered to the at least one second electrical connector.

10. The terminal block assembly according to claim 1 wherein the overmold is formed from a rubber material, a thermoplastic elastomer, and/or a plastic material.

11. The terminal block assembly according to claim 1 wherein the at least one secondary terminal is soldered to the at least one first electrical connector.

12. The terminal block assembly according to claim 1 wherein the overmold covers the at least one secondary terminal and the at least one first electrical connector.

13. The terminal block assembly according to claim 1 wherein the substrate is a printed circuit board.

14. The terminal block assembly according to claim 1 wherein the overmold completely surrounds at least a portion of the substrate.

15. The terminal block assembly according to claim 8 wherein the portion of the at least one wire is mounted to the substrate at a first position on the substrate and the at least one secondary terminal is mechanically and electrically connected to the substrate at a second position which is different to the first position.

16. A method of manufacture of a power tool comprising:
connecting at least one wire to at least one second electrical connector on a substrate;
covering the at least one second electrical connector and at least a portion of the at least one wire with an overmold;
mounting the substrate on at least one terminal of a terminal block, the substrate having at least one first electrical connector in electrical connection with the at least one second electrical connector;
connecting the at least one terminal to the at least one first electrical connector; and
mounting the terminal block and substrate on a housing of the power tool.

17. A terminal block assembly for a power tool comprising:
a terminal block having at least one primary terminal configured for electrical connection with a battery and at least one secondary terminal in electrical connection with the at least one primary terminal;
a substrate mounted on the terminal block, the substrate having at least one first electrical connector electrically connectable with the at least one secondary terminal and at least one second electrical connector in electrical connection with the at least one first electrical connector;
at least one wire electrically connected to the at least one second electrical connector; and
a curable material configured to cover the at least one second electrical connector and at least a portion of the at least one wire.

18. The terminal block assembly according to claim 17 wherein the curable material is an overmold or a glue.

* * * * *